United States Patent Office 2,853,416
Patented Sept. 23, 1958

2,853,416

METHOD OF PROTECTING PLANTS BY APPLYING A PESTICIDAL AMOUNT OF A POLYVINYL-PYRROLIDONE-IODINE ADDUCT

Henry B. Kellog, Tenafly, N. J., assignor to General Aniline & Film Corporation, New York, N. Y., a corporation of Delaware No Drawing. Application September 19, 1955
Serial No. 535,256

5 Claims. (Cl. 167—33)

This invention relates to new pesticidal compositions which are useful as insecticides, insectifuges, fungicides, and as foliar and soil nematocides.

Various organic compounds are currently employed in the control and eradication of agricultural and floricultural pests. Aldrin (1,2,3,4,10,10-hexachloro-1,4,4a,5,8,-8a-hexohydro-1,4,5,8-dimethanonaphthalene) and Dieldrin (1,2,3,4,10,10-hexachloro-6,7-epoxy-1,4,4a,5,6,7,8,-8a-octahydro-1,4,5,8-dimethanonaphthalene) are highly toxic products, and insecticidal formulations containing them must be handled with extreme care. Parathion (0,0-diethyl-o-p-nitrophenylthiophosphate) is a remarkably effective insecticide, and has been put to use on farms and greenhouses to control many kinds of destructive insects infesting various crops. Because of its extreme toxicity to warm blooded animals, this potent insecticide cannot be used to control insects affecting man and animals.

All of the foregoing organic insecticides, including DDT [1,1,1-trichloro-2,2-bis (p-chlorophenyl) ethane], Chlordane, tetraethylpyrophosphate, and the like, are water insoluble, but soluble in most of the currently employed organic solvents.

Insecticides differ in degree of toxicity. Man can tolerate pyrethrum and sulfur in rather large quantities, but small amounts of any one of the foregoing compounds would be dangerous. Special care must be observed in applying sprays or dusts containing the foregoing insecticides, especially the organic phosphorous compounds. It is absolutely essential to avoid breathing the dust or vapor of spray mist, and to avoid skin contact. Under conditions where large amounts of sprays or dusts are applied, the operator must wear a respirator together with waterproof or protective clothing that will cover all exposed skin surfaces.

Fumigants differ from insecticides in that the fumes must be confined so that the insect or pest is exposed to a considerable concentration for some time. Organic phosphate insecticides such as, hexaethyltetraphosphate (HETP), tetraethylpyrophosphate (TEPP), tetraethyldipyrophosphate, parathion and other organic materials such as, lindane, have been employed as aerosols in greenhouses to give a combined attack and fumigating effect. The vapors of these materials are toxic to insects in extremely low concentrations. For soil fumigation ethylene dibromide has been found to be an efficient and economical fumigant. It is a heavy liquid with a rather low rate of evaporation, and moves slowly through the soil. Liquid mixtures of dichloropropane and dichloropropylene which are much lighter than ethylene dibromide have been employed as soil fumigants, but the mixture is not nearly so toxic to soil insects.

The main disadvantage of the methods employed in soil fumigation is the cost of the equipment needed to treat large seed beds and the amount of time and labor involved in moving the equipment such as, injectors, broadcasters, etc. from place to place. With most fumigants a water seal must be applied immediately for best results. The treated area must be covered with burlap sacks, canvas, and the like, which in turn must be sprinkled with water and then removed after four or five days. The soil is then allowed to aerate, and no seeds planted until every trace of the fumigant has disappeared, which usually takes from 8–12 days. In wet, cool weather, it may take longer.

Chloropicrin forms a gas that is extremely toxic to plants in both the soil and the air. Under certain weather conditions a blanket of gas may collect over a fumigated bed near the ground, then drift slowly over a nearby area, and cause severe injury to the plants growing there, especially at night when foilage is wet with dew.

D-D which is a mixture of 1,3-dichloropropylene and 1,2-dichloropropane obtained as a by-product in the manufacture of allyl alcohol from petroleum is inflammable and is dangerous to use in enclosed space in the presence of sparks or open flames. It is dangerous to humans. Prolonged breathing of its vapors may cause the symptoms associated with the inhalation of the vapors of chlorinated hydrocarbons. It is very dangerous if spilled on the skin, shoes or clothing, and is likely to cause irritation, a burning sensation, and blistering. Such mixture is apt to cause injury to plants, and is, therefore, used almost entirely before planting.

Ethylene dibromide, which is a colorless liquid with a sharp chloroform-like odor, is highly toxic to humans, since it is absorbed through the skin. It is also toxic to many plants, and soils treated with it should be aired thoroughly before planting.

Practically all of the presently available soil fumigants are toxic to plants, and for this reason the manufacturers strongly urge and recommend that they be diffused out of the soil before a crop is planted, otherwise the plants may be stunted. The time required for adequate aeration of the soil varies greatly, and is influenced by many factors, including the kind of soil, the condition of the soil, and the fumigant used together with other factors.

In addition to the aforementioned fumigants, formaldehyde, Lindane (mixture of benzenehexachloride isomers) and Parathion are also effective for treating soil to destroy insects in greenhouses and plant nurseries where plants are growing. Small amounts of these materials are added to soil in the greenhouse bench to control symphilids. The effect is a combination of attack and fumigation. All of the currently used soil fumigants with the exception of formaldehyde and to some extent chloropicrin are water insoluble. They must be employed either in emulsion form or dissolved in a suitable organic solvent.

It is an object of the present invention to provide a new pesticidal composition which is not only water soluble but is also effective as an insecticide, insectifuge, fungicide, nematocide, and soil pesticide, and which is not toxic within certain limits of concentrations to plants and warm blooded animals including man.

Other objects and advantages will become apparent from the following description.

I have discovered that the adduct of iodine and polymeric N-vinyl-2-pyrrolidone, which is a very stable composition, soluble in water, is extremely effective in the preparation of pesticidal compositions which have no toxic effect as such, or the residues thereof on plants and warm blooded animals.

In U. S. Patent 2,706,701 of Hans Beller and W. A. Hosmer, issued on April 19, 1955, there is disclosed a novel composition of polymeric N-vinyl-2-pyrrolidone and iodine which has been found to be of substantial value for many applications in which advantage is taken of the bactericidal activity of the iodine, and in which the irritating and sensitizing toxic properties of the iodine are substantially overcome. The iodine and powdered polymer are mixed until a homogeneous powder is obtained, the mixing being carried out by grinding the iodine and polymeric N-vinyl-2-pyrrolidone in a mortar and pestle, or in a suitable mechanical mixer such as a ball mill constructed of materials which are not attacked by iodine. Thereafter the homogeneous mixture is heated for a period of time ranging from 22 to 64 hours at a temperature of 90–100° C. The time of mixing varies only with the efficiency thereof, as the combination of the polymeric N-vinyl-2-pyrrolidone with iodine on its surface is rapid, in fact, such combination will occur to some extent on dropping iodine crystals on the dry powdered polymer.

On completion of the mixing there is obtained a compound in a physical state similar to the polymer alone but which contains varying proportions of iodine available (as distinguished from free iodine), iodide ion, and bound iodine. A distinction between these forms may be made on an analytical basis, available iodine being determined directly by dissolving a sample of the product in water and titrating with 0.1-N sodium thiosulfate solution using starch as an indicator. The amount of iodine present as iodide ion is determined by reducing the iodine compound in solution with 1-N sodium acid sulfite, adding enough to make the solution colorless, then adding 0.1-N silver nitrate and enough nitric acid to make the solution acidic and back-titrating with ammonium thiocyanate. The iodide ion is the difference between this figure and the available iodine as determined above. The total iodine may be determined by combustion methods such as that formulated by Hallett in Scott's Standard Method of Chemical Analysis, bound iodine then being determined by subtracting the sum of available iodine and iodide ion from the total iodine as determined above.

The product thus obtained may have an available iodine content ranging from 2.0 to 25%. With any given sample of polymeric N-vinyl-2-pyrrolidone, the iodine present as available iodine and iodide ion may vary somewhat. Further details regarding this process may be obtained by reference to the aforementioned patent, the contents of which are incorporated herein by reference, especially, the various polymeric N-vinyl-2-pyrrolidone-iodine compositions as prepared in accordance with Examples I to VI inclusive.

The polymeric N-vinyl-2-pyrrolidone-iodine compositions prepared in accordance with the aforestated patent form aqueous solutions having a very high pesticidal activity. Aqueous solutions of the composition may be employed as such in the form of sprays or in combination with other fungicides or insecticides.

The most outstanding characteristics of the polymeric N-vinyl-2-pyrrolidone-iodine compositions when employed as pesticides are the following:

(1) Complete solubility in water, thus assuring uniform concentrations when employed as insecticides and fungicides, and deeper penetration into the soil when used to eradicate soil pests.

(2) Lower vapor pressure, thus allowing soil fumigation to proceed over a longer period, and provide for the retention of toxic concentrations of the composition in soil for extended periods. The composition will kill a number of insect species, but will not injure growing plants and aeration is not necessary before planting.

(3) In aqueous concentrations, even as high as 20% by weight, the polymeric N-vinyl-2-pyrrolidone-iodine adduct (containing as much as 25% available iodine) is not toxic to warm blooded animals, human beings, and plants in general. If the material is accidentally spilled on skin or clothing, there will be no physiological effect i. e. no injury to skin.

(4) Other unusual features and characteristics will become apparent from the following description:

Regardless of the concentration of the polymeric N-vinyl-2-pyrrolidone-iodine adduct in water, solutions thereof have a tendency to adhere to leaves and stems, including inflorescence, and form a thin film containing the toxic ingredient. With repeated rain or spray hosing, the film is readily dissolved and washed away. The polymeric N-vinyl-2-pyrrolidone-iodine adduct is not only useful as an insecticide, insectifuge, fungicide, but also against various foliar and root nematodes, and a large variety of soil pests. For example, aqueous solutions containing 0.075 to approximately 5% by weight of the iodine-adduct, when applied directly to plants, control various species of aphids, red spider mites, scales, etc. Dust compositions, i. e. mixed with a solid carrier such as clay, talc, etc. containing from 1 to 10% by weight of the iodine-adduct may be applied directly for insect and fungi control. Aqueous solutions or dust compositions containing from 0.1 to 5% by weight of the N-vinyl-2-pyrrolidone-iodine adduct control leaf nematodes, *Aphelenchoides ritzema-bosi;* root knot nematodes, Meloidogyne species; leaf spot, Alternaria species, *Septoria chrysanthemi* and *Cylindrosporium chrysanthemi.*

Aqueous solutions containing from 100 to 1000 parts per million of polymeric N-vinyl-2-pyrrolidone-iodine adduct are very efficient in the control and eradication of soil pests such as garden centipedes, i. e. symphilids, *Scutigerella immaculata,* wire worms, white-fringed beetle, beetle grubs and various other soil pests and nematodes.

It is to be noted that the application of aqueous solutions of the polymeric N-vinyl-2-pyrrolidone-iodine adduct does not require the costly equipment as is the case with the currently used soil fumigants and nematocides. The costs which are very high and the operations at times difficult are completely eliminated by the use of aqueous solutions in accordance with the present invention. The aqueous solution is merely sprayed on the soil in the concentration of 10–20% by weight and hosed in with water or rain and allowed to soak in. A light application may be made to the top of the soil, and the soil rototilled so as to loosen it up and to make it porous, and a second application given. Hosing or rain will wash the toxicant into the soil and kill the various insects with which it comes in contact.

The polymeric N-vinyl-2-pyrrolidone-iodine adducts whether employed as an aqueous solution or as a dust with or without the presence of wetting agents and in the aforestated concentrations, has an extremely low phytocidal action. In other words, they are non-toxic to plants but highly toxic to various insects, fungi, nematodes and soil pests. Instead of employing the polymeric N-vinyl-2-pyrrolidone-iodine adduct in either solution or dust form, the compound may be dissolved in a small amount of acetone or alcohol or even with water, and the aqueous solution emulsified with volatile liquid organic propellants, i. e. aerosols such as ethylene chloride, propylene chloride, or a mixture of ethylene chloride, carbontetrachloride, etc.

The following examples will illustrate the manner in which the pesticidal compositions prepared in the present invention may be employed in the control of destructive insects, fungi, nematodes, and the like.

*Example I*

1 level teaspoonful, weighing approximately 3.1 grams, of polymeric N-vinyl-2-pyrrolidone-iodine adduct (containing 10% available iodine) was dissolved in one gallon of water. The solution was sprayed under and over all the leaves of *Chrysanthemum morifolium* including two basal leaves which were infected with the leaf nematode, *Aphelenchoides ritzema-bosi.* After three days the infected basal leaves did not show a further spreading of the disease which is characterized by the development of brown wedge-shaped areas on foliage, usually starting at the base and working upward. The infected leaves were removed. With about four spray applications, perfect control of leaf nematodes was achieved, i. e., at the maturity date of the plant, it blossomed without showing any indication of nematode injury in any of the leaves.

*Example II*

A potted geranium (Pelargonium) in which the soil was infected with symphilids, *Scutigerella immaculata*, was wetted with an aqueous 0.5% solution of polymeric N-vinyl-2-pyrrolidone-iodine adduct containing 15% available iodine. The wetting was continued until the solution began to ooze out at the bottom of the drain. After 4 hours, the geranium plant was removed from the pot, and the soil dumped into a white earthenware vessel and sufficient water added to partially submerge the soil. With the aid of a 5-power magnifying lense, the surface of the water was observed with no activity in the symphilids. They were scooped out and placed into a Petri dish containing a thin layer of water, and the dish covered. After one hour the total inactivity persisted, thus indicating that a complete kill was effectuated of all the symphilids. The geranium plant was repotted in the same soil, fed a liquid fertilizer and grew in a normal healthy manner.

*Example III*

An aqueous solution of polymeric N-vinyl-2-pyrrolidone-iodine adduct (containing 10% available iodine) was prepared so that the concentration was 1000 p. p. m. 10 pre-adult or young adult nematodes of the species *Panagrellus redivivus* were immersed in the solution, while an additional 10 nematodes were placed in tap water as a control. Immediately a check was kept on the time. After 15 minutes, 30 minutes, 1 hour, 1½ hours, 2 hours and thereafter at 2-hour intervals for a period of 24 hours the nematodes were examined. The activity of the polymeric N-vinyl-2-pyrrolidone-iodine adduct was based on the time required for total inactivation. During this test it was found that within two hours the specimens were completely quiescent, and were incapable of further motion. For practical purposes the completely quiescent parasites can be considered as being dead. Between 2–4 hours all nematodes were dead. The blank control showed motility of the nematodes at the end of the 4-hour period.

The test was repeated with aqueous chloropicrin of the same concentration as a standard. A complete kill was obtained between 2–4 hours, thus indicating that the polymeric N-vinyl-2-pyrrolidone-iodine adduct is equal to the standard.

*Example IV*

A 5% aqueous solution of the polymeric N-vinyl-2-pyrrolidone-iodine adduct (containing 12% available iodine) was applied by means of a small camel hair brush to the dorsal thoracic region of 12 meal worm larvae, *Tenebrio molitor*. After 3 hours all the larvae were dead.

*Example V*

10 grams of polymeric N-vinyl-2-pyrrolidone-iodine adduct (containing 8% available iodine) and 5 grams of sodium lauryl sulphate were dissolved in water and brought up to two gallons. When applied in the form of a spray against red spider mites, *Tetranychus binaculatus*, it gave a kill of 100%. The same spray applied to the aphids, *Macrosiphum sanborni*, gave a kill of 98%.

*Example VI*

One gallon of the solution of Example V was sprayed upon a 3' x 2' flat of soil infected with damp off fungi, Fusarium spore. After a hosing with water to a depth of 8 inches, carnation seedlings were placed in the treated soil 6 inches apart. The seedlings grew vigorously, and no evidence of damping off was observed.

All diseases that primarily attack underground parts, and which are due to soil borne organisms such as root rot caused by fungi (Pythium, Rhizoctonia), wilt caused by fungi (Fusarium, Verticillium), root knot caused by nematodes, Meloidogyne species, can be effectively controlled by spraying the soil with aqueous solutions of polymeric N-vinyl-2-pyrrolidone-iodine adduct in which the percent of available iodine ranges from 5–15%.

It is to be clearly understood that the polymeric N-vinyl-2-pyrrolidone-iodine adduct prepared as above may be applied undiluted or with a carrier such as a suspension in water or mixed with talc, clay or other currently used carriers.

I claim:

1. A method of protecting chlorophyllaceous plant material subject to attack by plant pests which comprises applying to said material a pesticidal amount of polymeric N-vinyl-2-pyrrolidone-iodine adduct containing from 2–25% available iodine and a carrier therefor.

2. The method which comprises applying a pesticidal amount of polymeric N-vinyl-2-pyrrolidone-iodine adduct containing from 2–25% available iodine to chlorophyllaceous plants to be protected against fungi, insects and nematodes.

3. A process of fumigating soil adaptable for the growing of chlorophyllaceous plants which comprises introducing to said soil a fumigating amount of polymeric N-vinyl-2-pyrrolidone-iodine adduct containing from 2–25% available iodine.

4. A process of eradicating nematodes from the soils adaptable for the growing of chlorophyllaceous plants and minimizing attack thereby on plants, which comprises introducing into the soil in the vicinity of said nematodes a nematocidal amount of polymeric N-vinyl-2-pyrrolidone-iodine adduct containing from 2–25% available iodine.

5. A method for controlling chlorophyllaceous plant insects and soil organisms which comprises contacting said insects and organisms with an insecticidal amount of composition, containing as the essential toxic ingredient, polymeric N-vinyl-2-pyrrolidone-iodine adduct having from 2–25% available iodine.

References Cited in the file of this patent

UNITED STATES PATENTS

| 1,964,518 | Karns | June 26, 1934 |
| 2,498,174 | Morris | Feb. 21, 1950 |
| 2,706,701 | Beller et al. | Apr. 19, 1955 |
| 2,734,314 | MacKay | Feb. 14, 1956 |
| 2,742,736 | MacKay | Apr. 24, 1957 |

FOREIGN PATENTS

| 1,064,624 | France | May 17, 1954 |

OTHER REFERENCES

U. S. D. A., Agr. Handbook No. 69, May 1954, p. 197 (pp. 6, 7, 11–13 and 196, pert.).

Chem. Week, vol. 69, No. 25, December 22, 1951, pp. 19–20.